US009352821B2

(12) United States Patent
Wilander

(10) Patent No.: US 9,352,821 B2
(45) Date of Patent: May 31, 2016

(54) RETAINING DEVICE FOR INSULATION IN AN AIRCRAFT

(71) Applicant: The Boeing Company, Chicago, IL (US)

(72) Inventor: Ronald Eric Wilander, Woodinville, WA (US)

(73) Assignee: THE BOEING COMPANY, Chicago, IL (US)

( * ) Notice: Subject to any disclaimer, the term of this patent is extended or adjusted under 35 U.S.C. 154(b) by 392 days.

(21) Appl. No.: 14/177,466

(22) Filed: Feb. 11, 2014

(65) Prior Publication Data

US 2015/0225070 A1    Aug. 13, 2015

(51) Int. Cl.
*B64C 1/40* (2006.01)
*B60R 13/08* (2006.01)

(52) U.S. Cl.
CPC ............... *B64C 1/403* (2013.01); *B60R 13/08* (2013.01)

(58) Field of Classification Search
CPC .......... B64C 1/40; B64C 1/403; B60R 13/08; B60R 2013/0807; B61D 17/185; B62D 33/0604; A62C 3/08
See application file for complete search history.

(56) References Cited

U.S. PATENT DOCUMENTS 2,324,654 A * 7/1943 Tinnerman et al. ............. 52/479
5,680,680 A   10/1997 LaConte
8,523,112 B2   9/2013 Holvoet et al.

FOREIGN PATENT DOCUMENTS

WO    2010004121 A2    1/2010

* cited by examiner

*Primary Examiner* — Brian M O'Hara
(74) *Attorney, Agent, or Firm* — Yee & Associates, P.C.

(57) ABSTRACT

A method and apparatus for installing insulation. An apparatus comprises an elongate member having a first end and a second end. The elongate member is configured to be positioned between a first frame and a second frame to hold an insulation blanket against a skin panel. The first end comprises an angled portion configured to rest against the first frame. The second end comprises a curved portion configured to receive the second frame and hold the elongate member on the second frame.

15 Claims, 14 Drawing Sheets

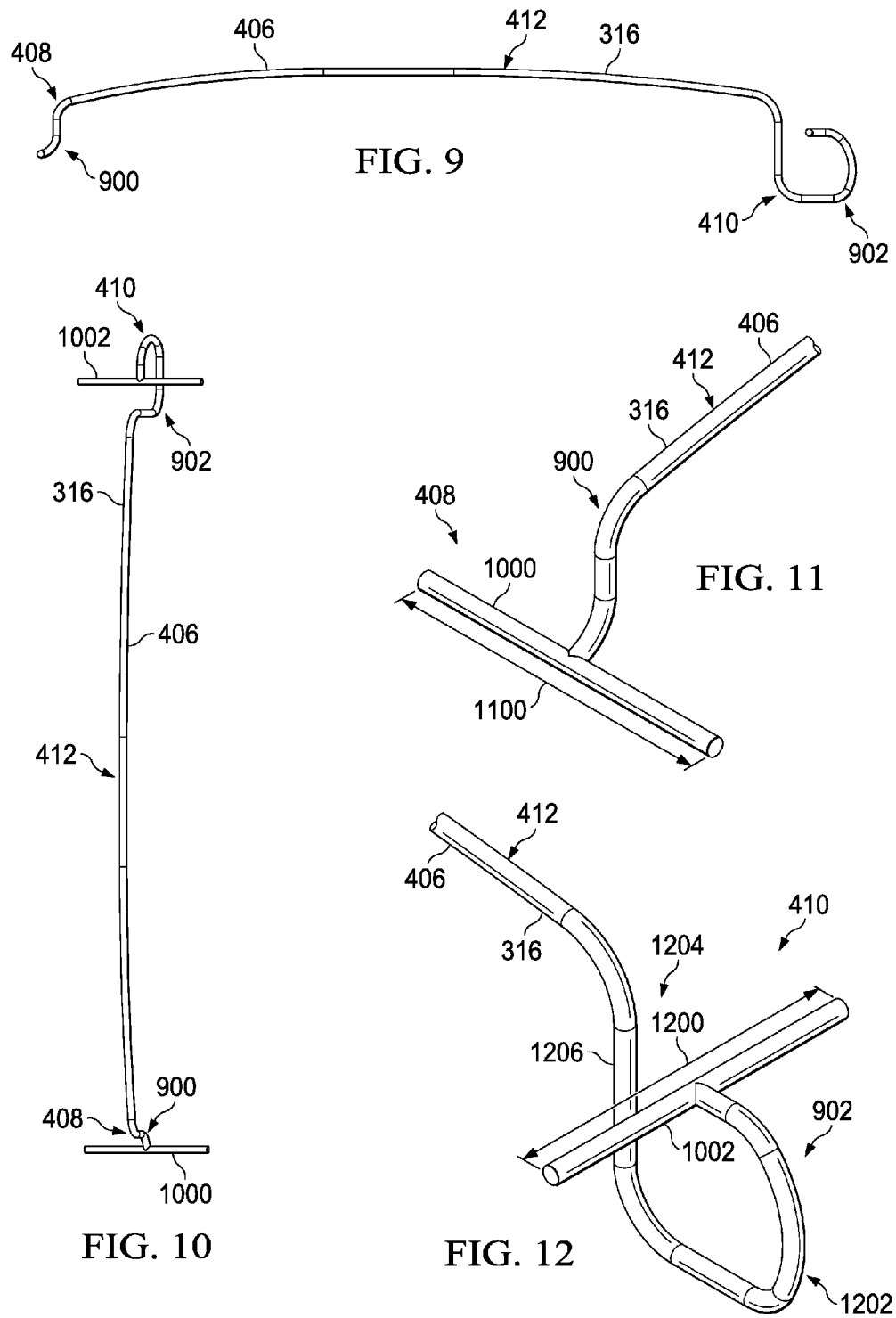

RETAINING DEVICE FOR INSULATION IN AN AIRCRAFT

BACKGROUND INFORMATION

1. Field

The present disclosure relates generally to aircraft and, in particular, to installing insulation systems in aircraft. Still more particularly, the present disclosure relates to a method and apparatus for holding insulation in an aircraft.

2. Background

Manufacturing an aircraft is a complex process. The process includes assembly of thousands of parts to form the aircraft. For example, stringers, frames, skin panels, or other components may be assembled to form a fuselage.

After forming the fuselage, insulation may be positioned along the inner surface of the fuselage. This insulation may be used to control temperatures within the fuselage. Temperatures within the fuselage are controlled to make the aircraft more comfortable for passengers, protect cargo, or both. The insulation is also used to reduce condensation that may form at the inner surface of the fuselage between the skin panels and the insulation blankets. This condensation forms when air within the fuselage is cooled to a temperature below its dew point.

Typically, insulation used to insulate the fuselage comprises an insulation material and a coating material. The insulation material may include a number of layers of fiberglass placed between two layers of coating material. "A number," as used herein with reference to items, means one or more items. For example, a number of layers of fiberglass means one or more layers of fiberglass.

The coating material may take the form of, for example, a water-resistant polyvinyl fluoride, or other suitable type of material. The fiberglass insulation and coating material form an insulation blanket that can be installed along the inner surface of the fuselage.

A number of insulation blankets may be used to insulate the fuselage. Insulation blankets are installed in a fuselage by positioning the insulation blankets along a skin panel of a fuselage between two frames. In some cases, two insulation blankets overlap each other.

The insulation blankets are then secured to the fuselage using a fastening system. The fastening system may include, for example, clips, pins, clamps, and other suitable types of fasteners. For instance, a clip may hold a portion of the insulation blanket to a frame. In another illustrative example, a hole is installed in the insulation blanket and the insulation blanket is fastened to a stringer using a pin and an assembly of washers.

In some cases, installation of these fastening systems, insulation blankets, or both may be more time-consuming than desired. Therefore, it would be desirable to have a method and apparatus that take into account at least some of the issues discussed above, as well as other possible issues.

SUMMARY

Embodiments of the disclosure provide a method and apparatus to retain an insulation blanket against a skin panel. The skin panel may be a skin panel located in a fuselage of an aircraft. Specifically, the illustrative embodiments disclose a retaining device having an elongate member that is positioned between two frames in the fuselage. The elongate member is comprised of a flexible material in some examples.

The elongate member holds the insulation blanket against the skin panel, while each end of the elongate member interfaces with a structural member of the fuselage. The shape and contour of each end of the elongate member keeps the elongate member in place during various stages of operation of the aircraft. The elongate member has a first end that rests against a web, a flange, or both, of the first frame. The second end of the elongate member has a curved portion that receives the second frame and rests against a web, a flange, or both, of the second frame. The shape of the first end and second end secure the elongate member between the first frame and the second frame.

The retaining device holds the insulation blanket against the skin panel using the elongate member while reducing the need for additional fastening systems. For instance, the use of clips, pins, clamps, and other fastening systems may be reduced or eliminated with the use of a retaining device as described herein. The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 9 is an illustration of a side view of a retaining device in accordance with an illustrative embodiment;

FIG. 10 is an illustration of a top view of a retaining device in accordance with an illustrative embodiment;

FIG. 11 is an illustration of an angled portion of a retaining device in accordance with an illustrative embodiment;

FIG. 12 is an illustration of a curved portion of a retaining device in accordance with an illustrative embodiment;

DETAILED DESCRIPTION

The illustrative embodiments recognize and take into account one or more different considerations. For example, the illustrative embodiments recognize and take into account that it may be desirable to hold an insulation blanket close to the skin panel of the fuselage such that the amount of moist air flowing between the skin panel and the insulation blanket is reduced. Some currently used systems, however, include clips that allow the insulation blanket to separate from the skin panel more than desired. For instance, the clips may slip such that the insulation blanket begins to sag. Preventing sagging of the insulation blanket decreases the amount of condensation that may form at the inner surface of the skin panel.

The illustrative embodiments further recognize and take into account that it may be desirable to hold the insulation blanket in place without installing holes in the insulation blanket. For example, the illustrative embodiments recognize and take into account that condensation formed at the inner surface of the fuselage collects between the skin panel and the insulation blanket. This condensation may leak through the holes in the insulation blanket. Leaking condensation leads to undesired results. For instance, the illustrative embodiments recognize and take into account that leaking condensation may result in discomfort for passengers.

The illustrative embodiments also recognize and take into account that when condensation does form at the inner surface of the skin panel of the fuselage, it is desirable to drain at least some of the condensation. For example, the illustrative embodiments recognize and take into account that is it desirable to drain at least some of the condensation before it is absorbed by the insulation blanket, leaked through the interfaces between two insulation blankets, or both.

Thus, the illustrative embodiments provide a method and apparatus for installing insulation in an aircraft. The apparatus comprises an elongate member having a first end and a second end. The elongate member is configured to be positioned between a first frame and a second frame in a fuselage of an aircraft to hold an insulation blanket against a skin panel of the fuselage. The first end comprises an angled portion configured to rest against the first frame. The second end comprises a curved portion configured to receive the second frame and hold the elongate member on the second frame.

Figure 1:
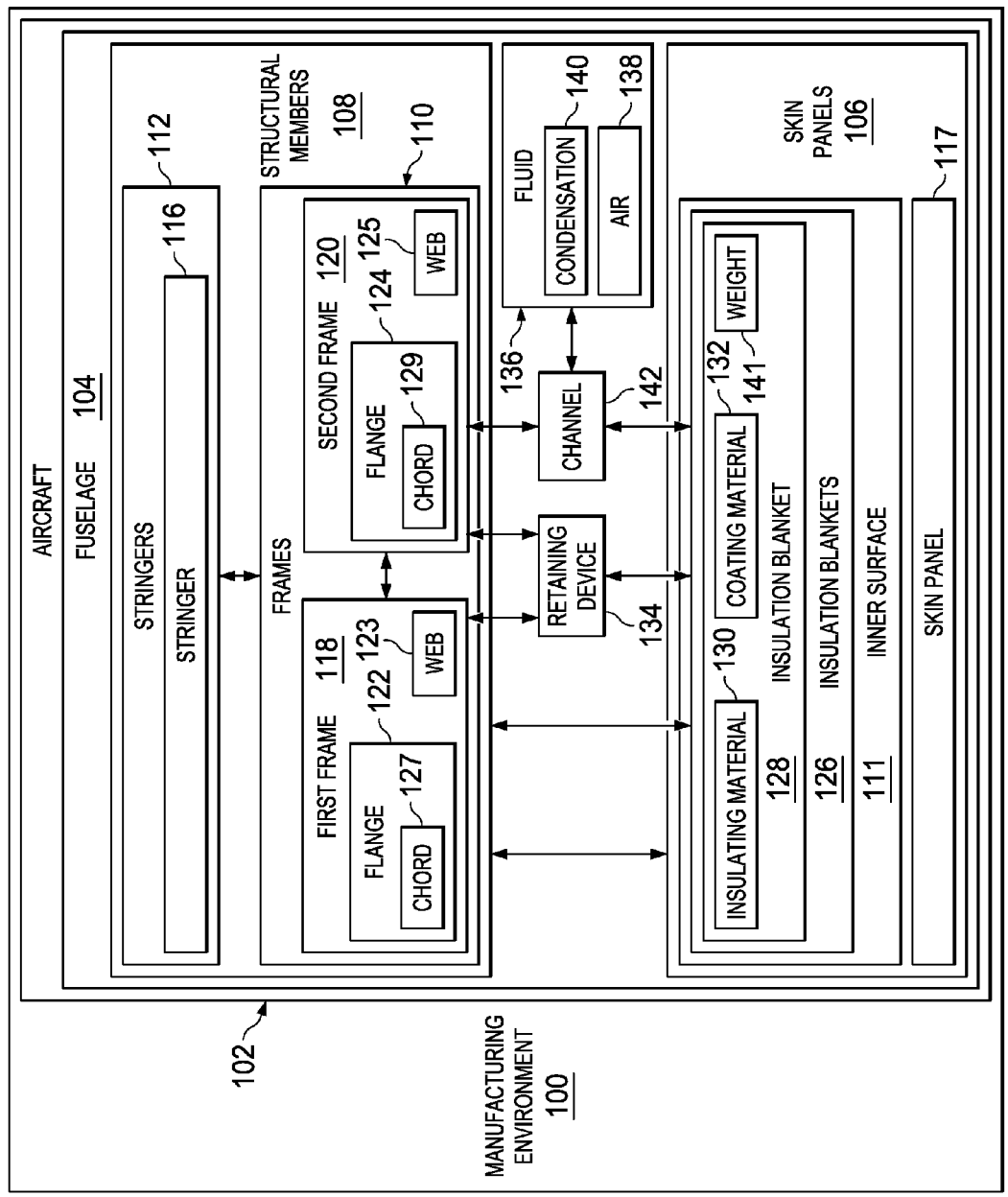
FIG. 1 is an illustration of a block diagram of a manufacturing environment in accordance with an illustrative embodiment.

Referring now to the figures and, in particular, with reference to FIG. 1, an illustration of a block diagram of a manufacturing environment is depicted in accordance with an illustrative embodiment. In this depicted example, manufacturing environment 100 includes aircraft 102.

In this illustrative example, manufacturing environment 100 is a location in which fuselage 104 of aircraft 102 is formed. In some illustrative examples, fuselage 104 of aircraft 102 is manufactured in sections and then assembled in manufacturing environment 100.

In this depicted example, fuselage 104 of aircraft 102 is assembled using skin panels 106 and structural members 108. Skin panels 106 form the surface of fuselage 104, while structural members 108 form the internal support structure of fuselage 104.

As depicted, skin panels 106 may be comprised of a number of different materials. For example, skin panels 106 may be comprised of a material selected from at least one of a metal, a metal alloy, a composite material, or some other suitable type of material. Skin panels 106 are fastened together at various joints to form fuselage 104.

As used herein, the phrase "at least one of," when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required.

For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

As illustrated, structural members 108 are mechanical structures that provide support for fuselage 104. Structural members 108 are configured to transfer aerodynamic loads acting on skin panels 106 and other structural members 108.

In this illustrative example, structural members 108 include frames 110 and stringers 112. Frames 110 are spaced-apart curved members in fuselage 104. Frames 110 may be rib-like and extend circumferentially around inner surface 111 of skin panels 106 to support skin panels 106 of fuselage 104. Frames 110 are configured to be fastened to skin panels 106 in this illustrative example.

As depicted, stringers 112 are spaced-apart members that run longitudinally through fuselage 104. Stringers 112 are configured to be fastened to skin panels 106, frames 110, or both in this illustrative example. Stringers 112 include stringer 116. Stringer 116 is configured to be fastened to skin panel 117 in this illustrative example. In some illustrative examples, stringer 116 is fastened to two of skin panels 106 overlapping at a joint.

As illustrated, frames 110 include first frame 118 and second frame 120. First frame 118 and second frame 120 are adjacent frames in this illustrative example. In other words, first frame 118 and second frame 120 are next to each other in fuselage 104. In this illustrative example, stringer 116 is positioned between first frame 118 and second frame 120.

In this depicted example, first frame 118 has flange 122 and web 123. Web 123 is the portion of first frame 118 that extends substantially perpendicular to skin panels 106, while flange 122 is a surface extending horizontally from web 123 of first frame 118. Second frame 120 has flange 124 and web 125. Web 125 is the portion of second frame 120 that extends substantially perpendicular to skin panels 106, while flange 124 is a surface extending horizontally from second frame 120. In this illustrative example, flange 122 and flange 124 may form chord 127 and chord 129 of first frame 118 and second frame 120, respectively.

As depicted, insulation blankets 126 are physically associated with inner surface 111 of fuselage 104. As used herein, a first component, such as insulation blankets 126, may be considered to be physically associated with a second component, such as inner surface 111 of fuselage 104, by being secured to the second component, bonded to the second component, mounted to the second component, welded to the second component, fastened to the second component, connected to the second component in some other suitable manner, or a combination thereof. The first component also may be connected to the second component using a third component. Further, the first component may be considered to be associated with the second component by being formed as part of, as an extension of the second component, or a combination thereof.

In this illustrative example, insulation blankets 126 are positioned along inner surface 111 of fuselage 104. Insulation blankets 126 may overlap in fuselage 104 and may be secured to structural members 108. Insulation blankets 126 are configured to insulate fuselage 104.

In this illustrative example, insulation blankets 126 include insulation blanket 128. Insulation blanket 128 is configured to insulate skin panel 117 of fuselage 104 between first frame 118 and second frame 120.

Insulation blanket 128 may take a number of different forms. For example, insulation blanket 128 comprises layers of insulating material 130 surrounded by layers of coating material 132.

In this illustrative example, insulating material 130 may be selected from at least one of fiberglass, expanded polystyrene (EPS), mineral wool, extruded polystyrene (XPS), or other suitable types of materials and combinations of materials. Coating material 132 may be selected from at least one of polyvinyl fluoride or other suitable types of coating material. Coating material 132 is configured to be water-resistant in this illustrative example.

As illustrated, insulation blanket 128 is positioned with respect to skin panel 117 of fuselage 104 between first frame 118 and second frame 120. Insulation blanket 128 is positioned such that insulation blanket 128 covers a portion of at least one of first frame 118, skin panel 117, second frame 120, or stringer 116. In other words, insulation blanket 128 is placed over one or more of these components.

In this depicted example, retaining device 134 is configured to hold insulation blanket 128 in place with respect to first frame 118 and second frame 120. In this illustrative example, retaining device 134 is a mechanical structure that holds insulation blanket 128 against skin panel 117 between first frame 118 and second frame 120.

As illustrated, retaining device 134 is moveably connected to first frame 118 and second frame 120 to hold insulation blanket 128 against skin panel 117. As a result, retaining device 134 may be removed and insulation blanket 128 may be reconfigured, replaced, modified, or a combination thereof. For example, retaining device 134 may be removed and insulation blanket 128 may be replaced with another insulation blanket. In other illustrative examples, retaining device 134 is moved from one location on insulation blanket 128 to another location on insulation blanket 128 to hold insulation blanket 128 in a desired manner.

In this depicted example, fluid 136 flows between skin panel 117 and insulation blanket 128. Fluid 136 takes a number of different forms. For example, fluid 136 may be a gas, a liquid, water, air, or some other suitable type of fluid. The amount of fluid 136 that flows between insulation blanket 128 and skin panel 117 may be reduced by retaining device 134. For instance, the more closely insulation blanket 128 is held against skin panel 117, the less fluid 136 may flow between insulation blanket 128 and skin panel 117.

Fluid 136 may change state as the environment around fuselage 104 changes. For example, fluid 136 may change from a gas to a liquid as the temperature outside of fuselage 104 drops below the temperature inside of fuselage 104.

In this illustrative example, air 138 flows between insulation blanket 128 and skin panel 117. As the temperature of skin panel 117 decreases due to a decreasing temperature outside of fuselage 104, condensation 140 may form on the inner surface of skin panel 117. Condensation 140 forms on the inner surface of skin panel 117 as air 138 inside of fuselage 104 is cooled to its dew point. In this illustrative example, the "dew point" of air 138 is the temperature below which the water vapor in air 138 condenses into liquid water. Condensation 140 is the liquid water in this illustrative example. In other illustrative examples, condensation 140 may be other liquids, depending on the particular implementation.

As depicted, insulation blanket 128 has weight 141. Weight 141 of insulation blanket 128 may change as the conditions in fuselage 104 change. For example, in some cases, condensation 140 is absorbed by insulation blanket 128. Weight 141 of insulation blanket 128 increases as condensation 140 is absorbed by insulation blanket 128. An increase in weight 141 of insulation blanket 128 may result in an undesired increase in weight of fuselage 104. Accordingly, once condensation 140 forms in fuselage 104, it may be desirable to drain some or all of condensation 140. In particular, condensation 140 may be drained before condensation 140 is absorbed into insulation blanket 128, leaked through insulation blanket 128, or both.

In this depicted example, condensation 140 may be drained through channel 142. Channel 142 is formed between insulation blanket 128 and second frame 120. Channel 142 includes the open space between insulation blanket 128 and second frame 120. When condensation 140 forms, condensation 140 may be directed into channel 142 to be drained from the area around insulation blanket 128.

In this illustrative example, retaining device 134 is configured to support the weight of condensation 140 that is directed into channel 142. For example, when retaining device 134 is holding insulation blanket 128 in the overhead portion of fuselage 104, condensation 140 collects in channel 142. The shape of retaining device 134 allows condensation 140 to collect in channel 142 such that condensation 140 may flow through channel 142. In other words, retaining device 134 does not restrict the flow of condensation 140 through channel 142, while still holding insulation blanket 128 in place. In this manner, channel 142 serves as a guttering system for fuselage 104 that drains condensation 140 from overhead portions of fuselage 104 using retaining device 134 for support.

Figure 2:
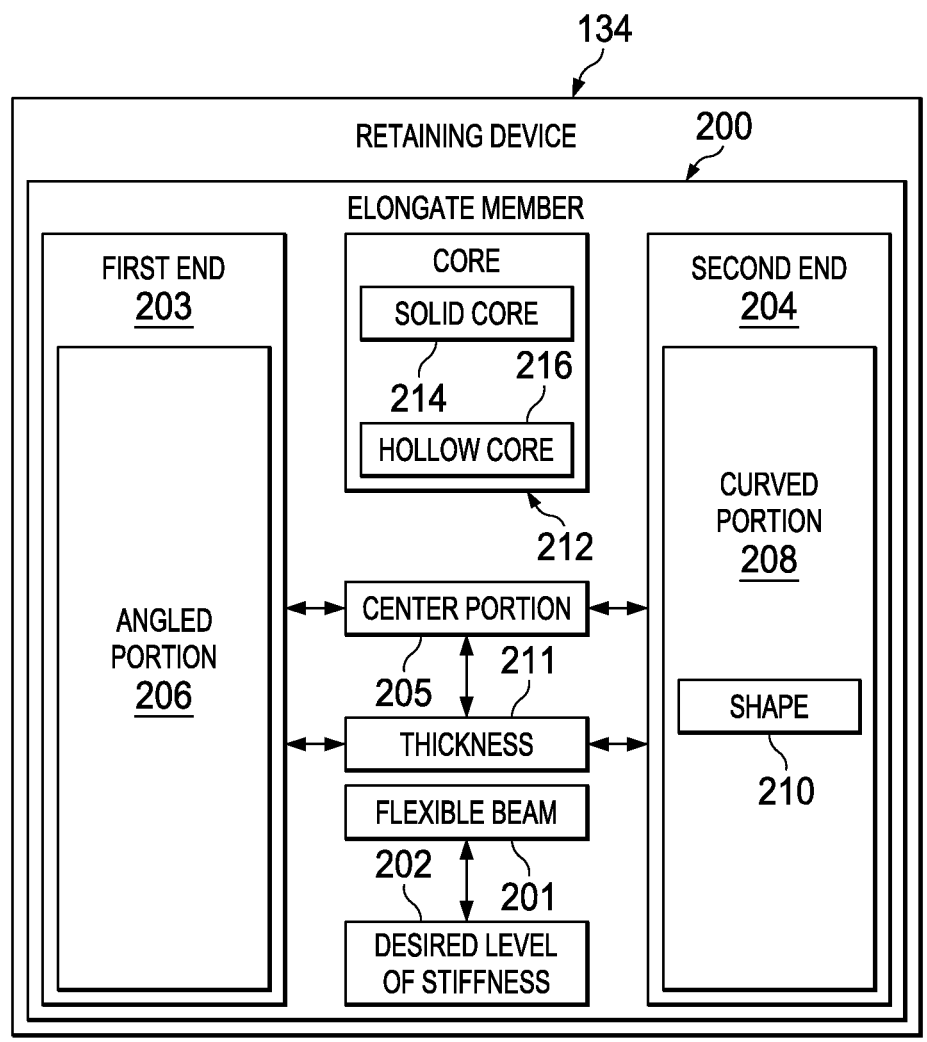
FIG. 2 is an illustration of a block diagram of a retaining device in accordance with an illustrative embodiment.

Turning next to FIG. 2, an illustration of a block diagram of a retaining device is depicted in accordance with an illustrative embodiment. In this depicted example, components within retaining device 134 are shown.

As depicted, retaining device 134 comprises elongate member 200. Elongate member 200 is a mechanical structure positioned between first frame 118 and second frame 120 of fuselage 104 in FIG. 1. Elongate member 200 is configured to hold insulation blanket 128 against skin panel 117 in FIG. 1. Elongate member 200 may bend as weight 141 of insulation blanket 128 in FIG. 1 increases.

In being configured to hold insulation blanket 128 against skin panel 117, elongate member 200 may have a means for holding insulation blanket 128 against skin panel 117. The means may be, for example, without limitation, a rod, a beam, a bar, a pole, a dowel, a crosspiece, or other types of elongate structures that hold insulation blanket 128 against skin panel 117. When the means is implemented using these and other structures, the structures may be uniform in diameter, tapered, may include a bend, or any other form that allows for holding insulation blanket 128 in place against skin panel 117. Elongate member 200 takes the form of flexible beam 201 in this illustrative example.

Elongate member 200 may be comprised of a number of different materials. For instance, elongate member 200 may be comprised of a plastic, a composite material, a metal, a metal alloy, or some other suitable type of material or combination of material.

Materials selected for elongate member 200 may also be selected to reduce the risk of damage to insulation blanket 128, reduce the weight of fuselage 104, or a combination thereof. For instance, a plastic may be used for elongate member 200 to decrease the weight of retaining device 134, while providing a material than is less likely to damage insulation blanket 128 than metal.

As depicted, elongate member 200 has desired level of stiffness 202. Desired level of stiffness 202 is the extent to which elongate member 200 resists deformation under weight 141 of insulation blanket 128.

In this depicted example, elongate member 200 has first end 203, second end 204, and center portion 205 between first end 203 and second end 204. First end 203 of elongate member 200 is associated with first frame 118 and second end 204 is associated with second frame 120.

As depicted, first end 203 has a means for resting against first frame 118. The means may be, for example, without limitation, a clip, a tie, an angled structure, a flat structure, a bar, a pin, a loop, a curved structure, a ridge, a flange, or other types of structures that rest against first frame 118. When the means is implemented using these and other structures, the means may rest against web 123, flange 122, or both web 123 and flange 122 of first frame 118, receive first frame 118, or rest against first frame 118 in some other manner.

In this illustrative example, first end 203 comprises angled portion 206. Angled portion 206 is configured to rest against first frame 118. In this illustrative example, angled portion 206 is configured to rest on flange 122 of first frame 118.

In this depicted example, second end 204 has a means for receiving second frame 120 and holding elongate member 200 on second frame 120. The means may be, for example, without limitation, a clip, a tie, a curved structure, a loop, a groove, an indentation, a c-shaped structure, a channel within a structure, or other types of structures that receive second frame 120 and hold elongate member 200 on second frame 120. When the means is implemented using these and other structures, the means may rest against a portion of web 125, flange 124, or both web 125 and flange 124 of second frame 120 or receive second frame 120 in some other manner. The means may also permanently or temporarily attach to second frame 120 in some instances.

As illustrated, second end 204 comprises curved portion 208. Curved portion 208 is configured to receive second frame 120 and hold elongate member 200 on second frame 120. In this illustrative example, curved portion 208 is configured to loop around second frame 120 and rest on flange 124 of second frame 120.

Curved portion 208 of second end 204 of elongate member 200 has shape 210 in this illustrative example. Shape 210 for curved portion 208 is selected from one of a c-shape, a u-shape, a circular shape, and other suitable shapes.

In this depicted example, shape 210 for curved portion 208 is selected such that second end 204 of elongate member 200 is configured to support insulation blanket 128 as weight 141 of insulation blanket 128 increases. Channel 142 is formed between second frame 120 and insulation blanket 128 such that fluid 136 namely condensation 140, is drained through channel 142 between second frame 120 and insulation blanket 128 in FIG. 1.

As illustrated, elongate member 200 has thickness 211. Thickness 211 of elongate member 200 may be about the same thickness or a different thickness at different points along elongate member 200. For instance, thickness 211 at center portion 205 is greater than thickness 211 at first end 203 and second end 204 in one illustrative example. In another illustrative example, thickness 211 of elongate member 200 tapers from center portion 205 to first end 203 and from center portion 205 to second end 204.

Shape 210 for curved portion 208 of second end 204 of elongate member 200 also may be selected to reduce damage to insulation blanket 128. For instance, instead of sharp angled surfaces along elongate member 200, curved portion 208 may have smooth surfaces.

In this illustrative example, elongate member 200 has core 212. Core 212 is the internal structure of elongate member 200. Core 212 may be selected from one of solid core 214, hollow core 216, or a combination thereof. When elongate member 200 has solid core 214, core 212 does not comprise spaces, channels, or other gaps in the material used for elongate member 200.

When elongate member 200 has hollow core 216, a number of spaces are present in elongate member 200. For instance, a channel may be formed within elongate member 200.

The illustrations of manufacturing environment 100 and retaining device 134 in FIG. 1 and the components of retaining device 134 in FIG. 2 are not meant to imply physical or architectural limitations to the manner in which an illustrative embodiment may be implemented. Other components in addition to, or in place of, the ones illustrated may be used. Some components may be optional. Also, the blocks are presented to illustrate some functional components. One or more of these blocks may be combined, divided, or combined and divided into different blocks when implemented in an illustrative embodiment.

For example, although retaining device 134 has been described as a single structure, more than one structure may be joined together to form retaining device 134. In other illustrative examples, thickness 211 of retaining device 134 may be greater at first end 203 and second end 204 than at center portion 205.

In still other illustrative examples, retaining device 134 may be used with other retaining devices, fastening systems, or a combination thereof to hold insulation blanket 128 in place. For example, a number of additional retaining devices may be used to hold insulation blanket 128 against skin panel 117 between first frame 118 and second frame 120.

In yet another illustrative example, second end 204 may have an angled portion in addition to, or in place of, curved portion 208. For instance, second end 204 may be angled and then loop around second frame 120. In still another illustrative example, both first end 203 and second end 204 may have a curved portion.

Figure 3:
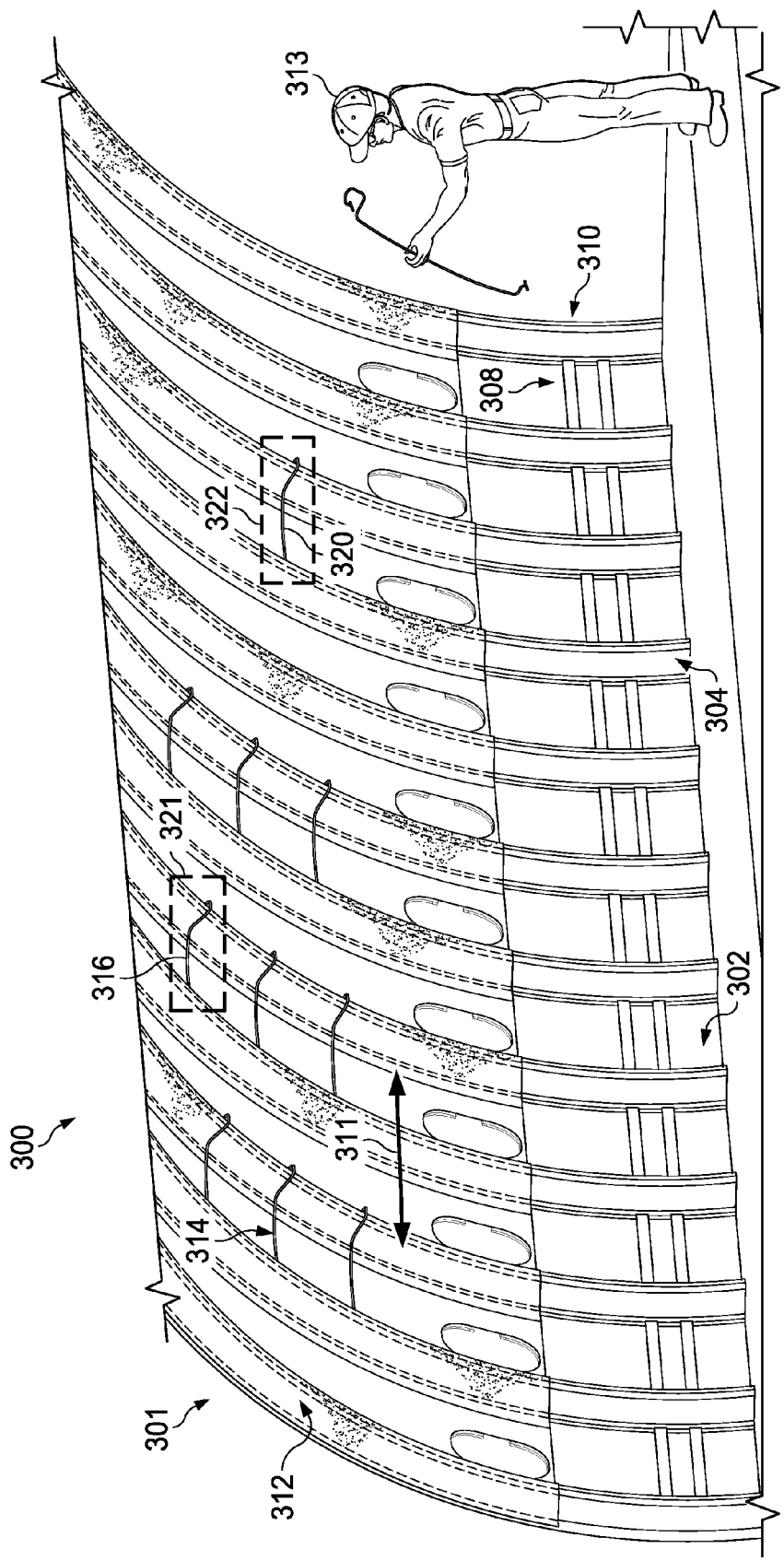
FIG. 3 is an illustration of a manufacturing environment in accordance with an illustrative embodiment.

With reference next to FIG. 3, an illustration of a manufacturing environment is depicted in accordance with an illustrative embodiment. In this depicted example, manufacturing environment 300 with fuselage 301 is an example of a physical implementation for manufacturing environment 100 with fuselage 104 of aircraft 102 shown in block form in FIG. 1.

As depicted, manufacturing environment 300 includes fuselage 301. Fuselage 301 is formed from skin panels 302 and structural members 304 in this illustrative example.

In this depicted example, structural members 304 include frames 308 and stringers 310. Frames 308 and stringers 310 are fastened to skin panels 302 to form fuselage 301 in this illustrative example. Frames 308 extend circumferentially around fuselage 301, while stringers 310 run longitudinally through fuselage 301 in the direction of arrow 311.

As illustrated, insulation blankets 312 have been installed in a portion of fuselage 301 by human operator 313. Human operator 313 installs insulation blankets 312 by placing an insulation blanket over one of skin panels 302 and corresponding structural members 304 and securing the insulation blanket using retaining devices 314.

In this illustrative example, insulation blankets 312 are held against skin panels 302 using retaining devices 314. Retaining devices 314 include retaining device 316 and retaining device 320. Retaining device 316 is installed in section 321 and retaining device 320 is installed in section 322 of fuselage 301.

Figure 4:
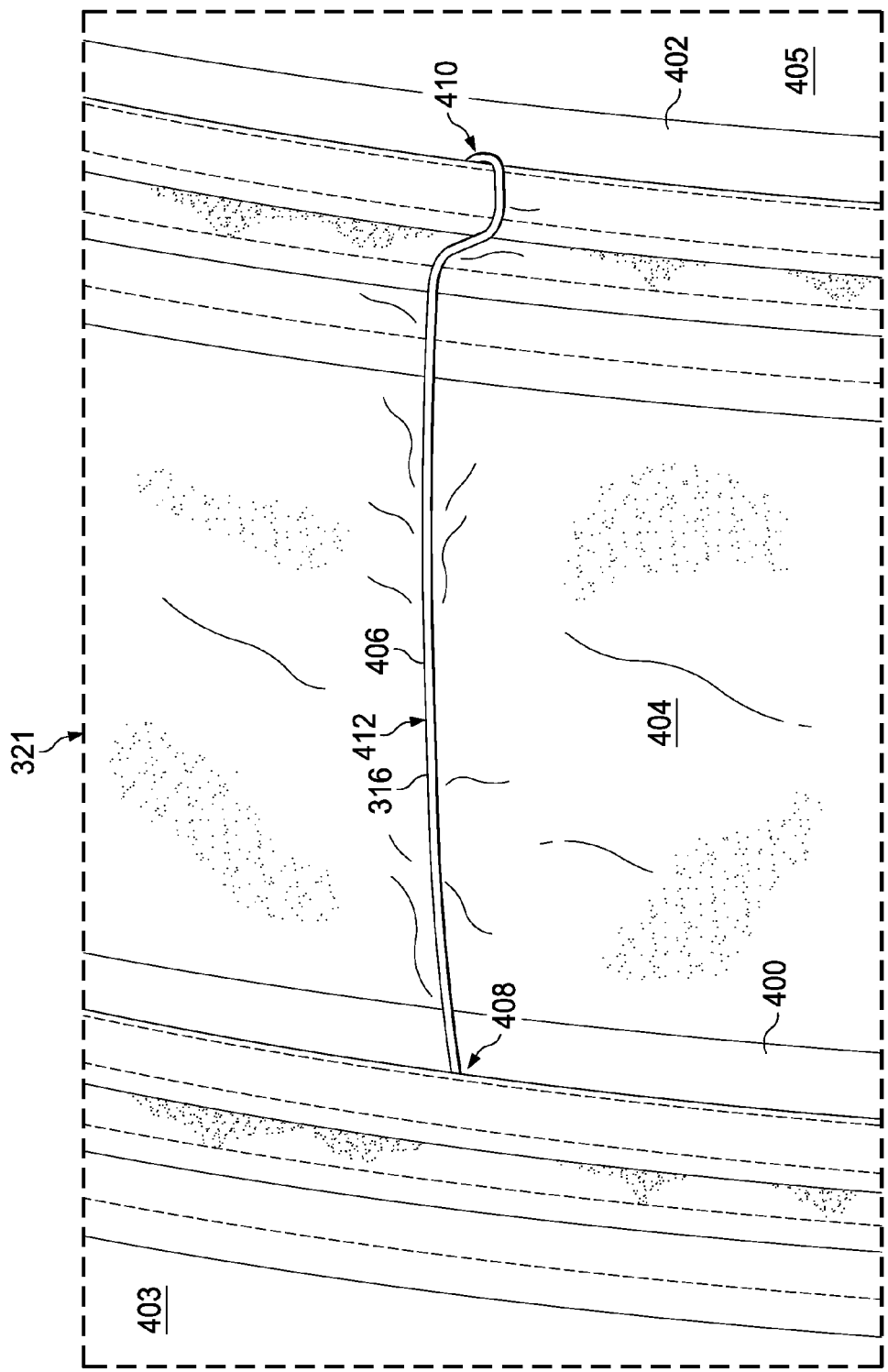
FIG. 4 is an illustration of a retaining device installed in a section of a fuselage in accordance with an illustrative embodiment.

Turning now to FIG. 4, an illustration of a retaining device installed in a section of a fuselage is depicted in accordance with an illustrative embodiment. In this depicted example, a more detailed illustration of retaining device 316 is shown installed in section 321 of fuselage 301 from FIG. 3.

As depicted, section 321 of fuselage 301 includes first frame 400 and second frame 402 located underneath insulation blankets 312 in FIG. 3. A number of stringers (not shown in this view) are positioned longitudinally between first frame 400 and second frame 402. Insulation blanket 403, insulation blanket 404, and insulation blanket 405 have been positioned over first frame 400, second frame 402, and the stringers. Insulation blanket 403, insulation blanket 404, and insulation blanket 405 are configured to insulate a number of skin panels (not shown) of fuselage 301.

In this depicted example, insulation blanket 403 and insulation blanket 404 overlap at first frame 400. For example, a portion of the covering for insulation blanket 404 may overlap insulation material in insulation blanket 403 at first frame 400. In a similar fashion, insulation blanket 404 and insulation blanket 405 overlap at second frame 402. For instance, a portion of the covering for insulation blanket 405 may overlap insulation material in insulation blanket 404 at second frame 402. This configuration of insulation blanket 403, insulation blanket 404, and insulation blanket 405 helps reduce the risk of condensation leaking through the interfaces between insulation blankets.

As illustrated, retaining device 316 is positioned between first frame 400 and second frame 402. Retaining device 316 comprises elongate member 406 with first end 408, second end 410, and center portion 412 between first end 408 and second end 410.

In this illustrative example, first end 408 of elongate member 406 holds insulation blanket 403 and insulation blanket 404 against first frame 400. Second end 410 of elongate member 406 loops around second frame 402 to hold insulation blanket 404 and insulation blanket 405 against second frame 402. Center portion 412 of elongate member 406 holds insulation blanket 404 against the skin panel. In this manner, insulation blanket 404 is held in place without installing holes in insulation blanket 404.

In this view, looking upward, when condensation forms between the skin panel and insulation blanket 405, the condensation may collect around second frame 402 in a channel (not shown) between second frame 402 and insulation blanket 405. Channel 142 in FIG. 1 allows drainage of condensation such that the condensation is not absorbed by insulation blanket 405 or leaked into the fuselage. Second end 410 supports insulation blanket 405 and the additional weight from the condensation.

Figure 5:
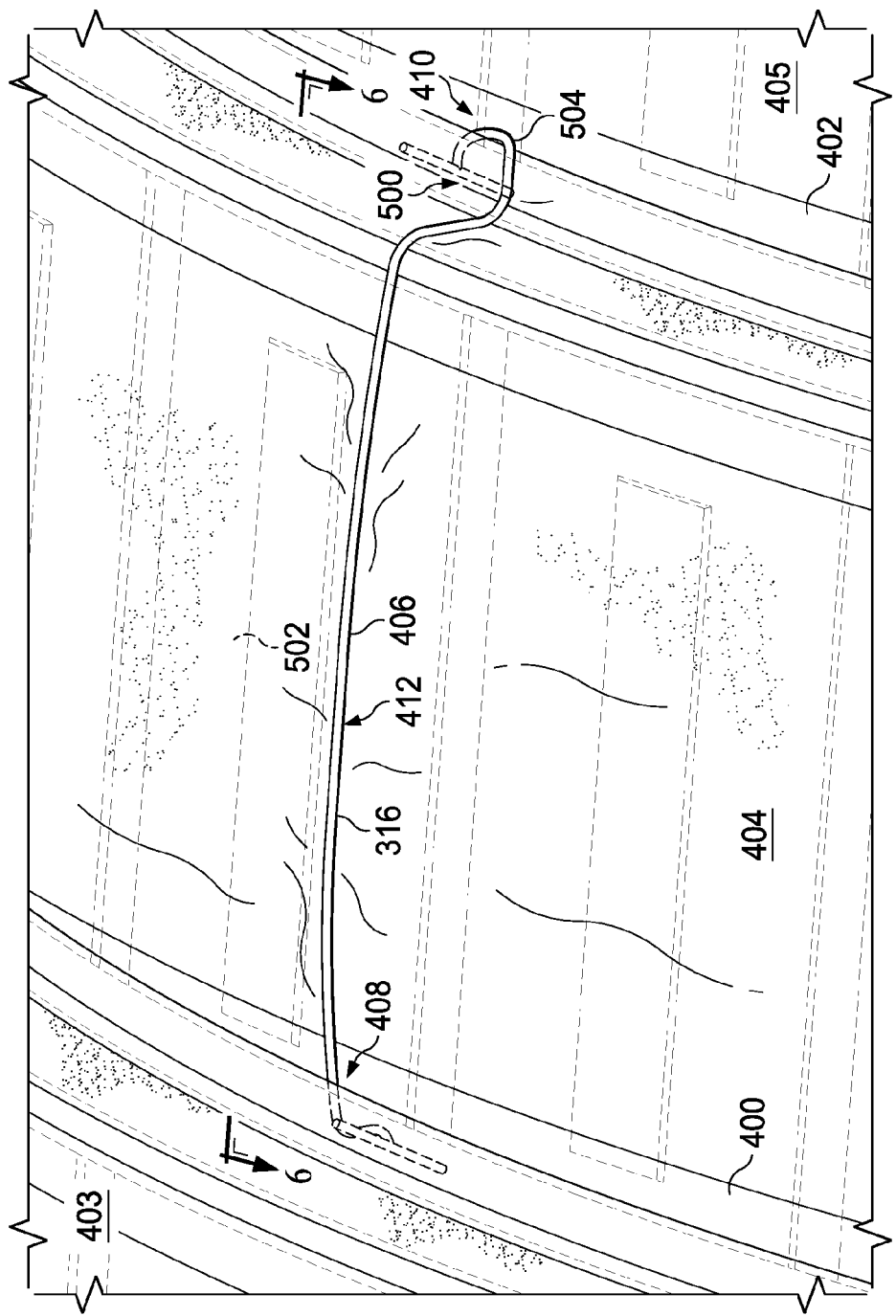
FIG. 5 is an illustration of a perspective view of a second frame with an insulation blanket in accordance with an illustrative embodiment.

Referring next to FIG. 5, an illustration of a perspective view of a second frame with an insulation blanket is depicted in accordance with an illustrative embodiment. In this illustrative example, second frame 402 from FIG. 4 is shown in phantom with insulation blanket 405 covering second frame 402.

As depicted, channel 500 is present between insulation blanket 405 and second frame 402. Channel 500 allows a fluid to pass between insulation blanket 405 and second frame 402. For example, condensation may pass between insulation blanket 405 and second frame 402 through channel 500. In this illustrative example, no condensation has formed on skin panel 502 between insulation blanket 405 and skin panel 502.

Figure 6:
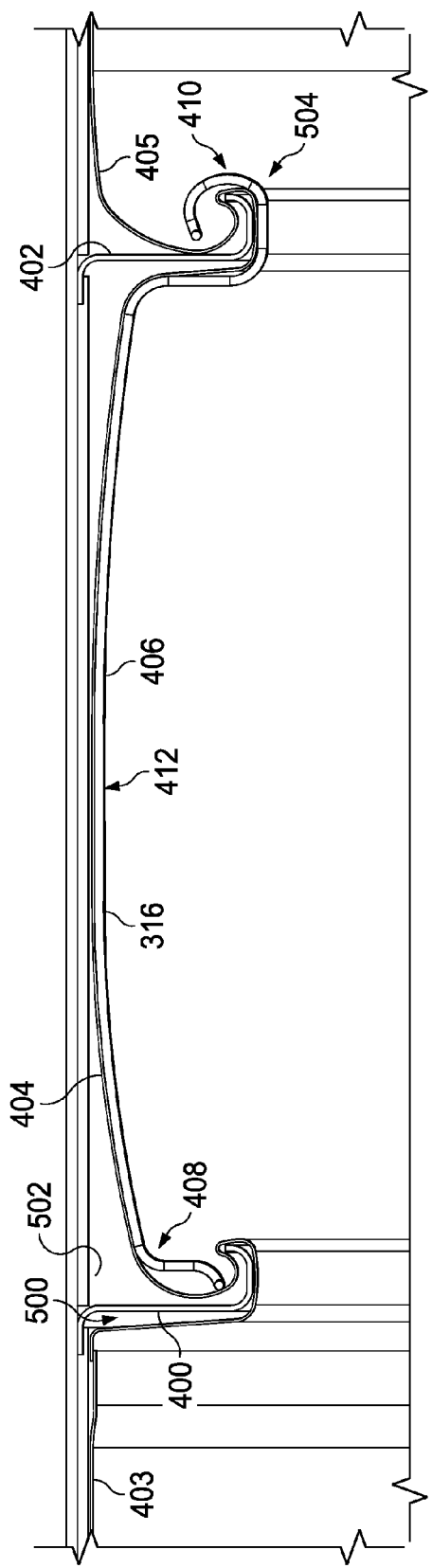
FIG. 6 is an illustration of a cross-sectional view of a second frame with an insulation blanket in accordance with an illustrative embodiment.

Turning next to FIG. 6, an illustration of a cross-sectional view of a second frame with an insulation blanket is depicted in accordance with an illustrative embodiment. In this depicted example, a cross-sectional view of second frame 402 with insulation blanket 405 is shown taken along the lines 6-6 in FIG. 5. Since no condensation has formed on skin panel 502 in this illustrative example, no condensation has collected in channel 500.

Figure 7:
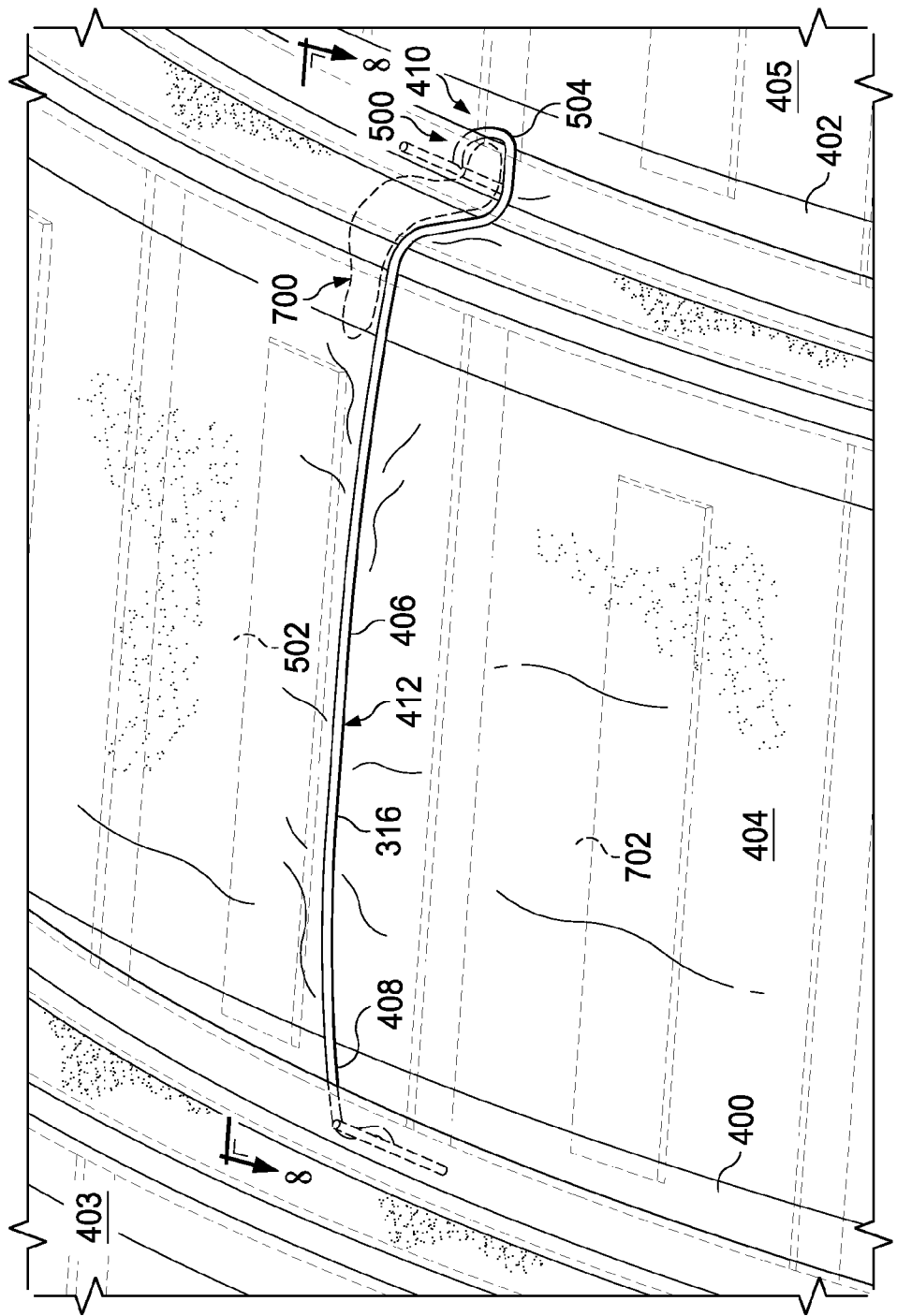
FIG. 7 is an illustration of a perspective view of a second frame with an insulation blanket in accordance with an illustrative embodiment.

In FIG. 7, an illustration of a perspective view of a second frame with an insulation blanket is depicted in accordance with an illustrative embodiment. In this illustrative example, second frame 402 from FIG. 4 is shown in phantom with insulation blanket 405 covering second frame 402.

As depicted, condensation 700 has formed at inner surface 702 of skin panel 502. In this illustrative example, condensation 700 collects in channel 500. As condensation 700 collects in channel 500, the weight of insulation blanket 405 with condensation 700 increases.

As illustrated, channel 500 allows condensation 700 to pass between insulation blanket 405 and second frame 402 such that condensation 700 may drain from the area around insulation blanket 405. Second end 410 of retaining device 316 with curved portion 504 supports the weight of insulation blanket 405 and condensation 700 as condensation 700 drains from channel 500.

Figure 8:
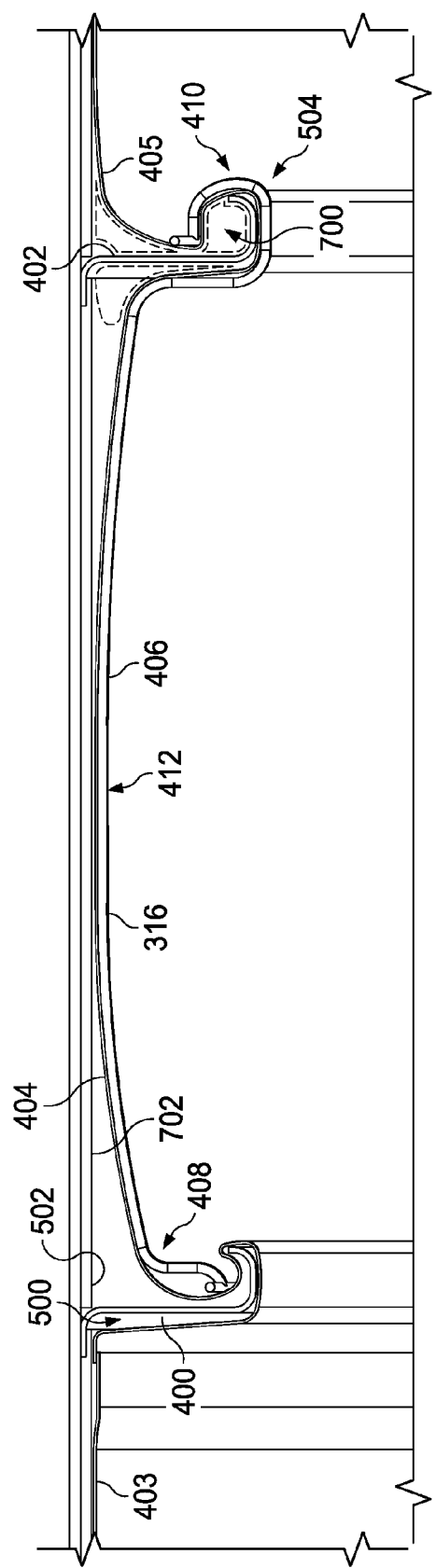
FIG. 8 is an illustration of a cross-sectional view of a second frame with an insulation blanket in accordance with an illustrative embodiment.

With reference now to FIG. 8, an illustration of a cross-sectional view of a second frame with an insulation blanket is depicted in accordance with an illustrative embodiment. In this depicted example, a cross-sectional view of second frame 402 with insulation blanket 405 is taken along the lines 8-8 in FIG. 7.

As depicted, condensation 700 has collected in channel 500. In this illustrative example, channel 500 now acts as a guttering system to drain condensation 700 from between second frame 402 and insulation blanket 405.

With reference next to FIG. 9, an illustration of a side view of a retaining device is depicted in accordance with an illustrative embodiment. In this depicted example, a side view of retaining device 316 from FIG. 4 is shown.

As depicted, first end 408 of retaining device 316 has angled portion 900. Angled portion 900 rests against first frame 400 in FIG. 4. Angled portion 900 holds insulation blanket 404 in FIG. 4 against first frame 400 and the skin panel.

In this illustrative example, second end 410 of retaining device 316 has curved portion 902. Curved portion 902 receives second frame 402 in FIG. 4 and holds elongate member 406 on second frame 402. Curved portion 902 also holds insulation blanket 404 and insulation blanket 405 in FIG. 4 against second frame 402 on both sides of second frame 402.

In FIG. 10, an illustration of a top view of a retaining device is depicted in accordance with an illustrative embodiment. In this depicted example, a top view of retaining device 316 is shown.

As illustrated, angled portion 900 of first end 408 of retaining device 316 has bar 1000. Bar 1000 extends from first end 408 in a direction perpendicular to elongate member 406. Bar 1000 is configured to rest against a chord of first frame 400 in FIG. 4 to hold insulation blanket 404 in place.

In this illustrative example, curved portion 902 of second end 410 of retaining device 316 has bar 1002. Bar 1002 extends from second end 410 in a direction perpendicular to elongate member 406. Bar 1002 is configured to rest against the chord of second frame 402 in FIG. 4. Bar 1002 holds insulation blanket 405 in place in this illustrative example.

With reference now to FIG. 11, an illustration of an angled portion of a retaining device is depicted in accordance with an illustrative embodiment. In this depicted example, a more detailed illustration of angled portion 900 of first end 408 of retaining device 316 with bar 1000 is shown.

In this illustrative example, bar 1000 has length 1100. Length 1100 is selected such that insulation blanket 404 is held in a desired position, exerts a desired amount of force against the chord, or flange, of first frame 400 in FIG. 4, or both. Length 1100 is also selected such that first end 408 of retaining device 316 does not damage insulation blanket 128. In one illustrative example, length 1100 may be about 2 inches to about 6 inches. In other illustrative examples, length 1100 may be more or less, depending on the particular implementation.

Turning to FIG. 12, an illustration of a curved portion of a retaining device is depicted in accordance with an illustrative embodiment. In this depicted example, a more detailed illustration of curved portion 902 of second end 410 of retaining device 316 with bar 1002 is shown.

As illustrated, bar 1002 has length 1200. Length 1200 is selected such that insulation blanket 405 is held in a desired position, exerts a desired amount of force against the chord of second frame 402 in FIG. 4, and provides lateral stability for retaining device 316, or both. In one illustrative example, length 1200 may be about 2 inches to about 6 inches. In other illustrative examples, length 1200 may be more or less, depending on the particular implementation. Length 1100 selected for bar 1000 in FIG. 11 may be the same or different than length 1200 selected for bar 1002 in this illustrative example.

As depicted, curved portion 902 of second end 410 of retaining device 316 has c-shape 1202. Gap 1204 is present in c-shape 1202. As human operator 313 in FIG. 3 installs retaining device 316, human operator 313 opens gap 1204 and places second frame 402 through gap 1204. The flexible material used to make retaining device 316 allows curved portion 902 to bend to receive second frame 402 and return to its original shape once curved portion 902 is positioned around second frame 402.

In this depicted example, second end 410 of retaining device 316 has segment 1206. Segment 1206 is configured to press insulation blanket 405 against the web of second frame 402 in this illustrative example.

Figure 13:
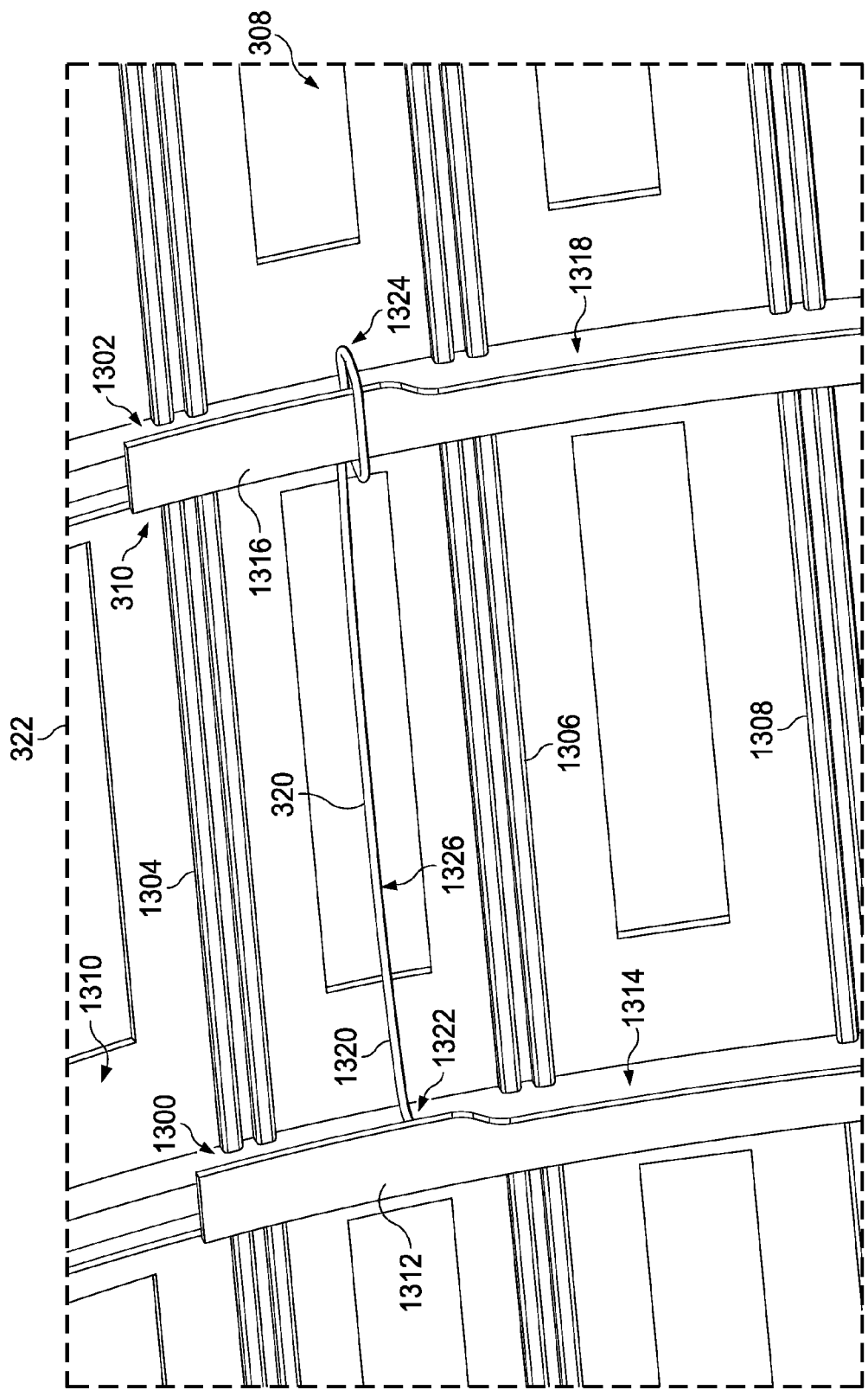
FIG. 13 is an illustration of a retaining device positioned in a section of a fuselage in accordance with an illustrative embodiment.

Turning now to FIG. 13, an illustration of a retaining device positioned in a section of a fuselage is depicted in accordance with an illustrative embodiment. In this depicted example, a more detailed illustration of retaining device 320 is shown positioned in section 322 of fuselage 301 from FIG. 3. No insulation blankets have been installed in section 322 of fuselage 301 in FIG. 3 in this illustrative example.

As depicted, section 322 of fuselage 301 includes first frame 1300 and second frame 1302. Stringer 1304, stringer 1306, and stringer 1308 are positioned longitudinally between first frame 1300 and second frame 1302. First frame 1300, second frame 1302, stringer 1304, stringer 1306, and stringer 1308 are connected to skin panels 1310 in this illustrative example.

As illustrated, first frame 1300 has chord 1312 and web 1314. Second frame 1302 has chord 1316 and web 1318. Retaining device 320 is positioned between first frame 1300 and second frame 1302.

In this depicted example, retaining device 320 comprises elongate member 1320 with first end 1322, second end 1324, and center portion 1326 between first end 1322 and second end 1324.

In this illustrative example, first end 1322 rests against web 1314 of first frame 1300. Second end 1324 rests against web 1318 of second frame 1302. Second end 1324 also loops around second frame 1302.

Figure 14:
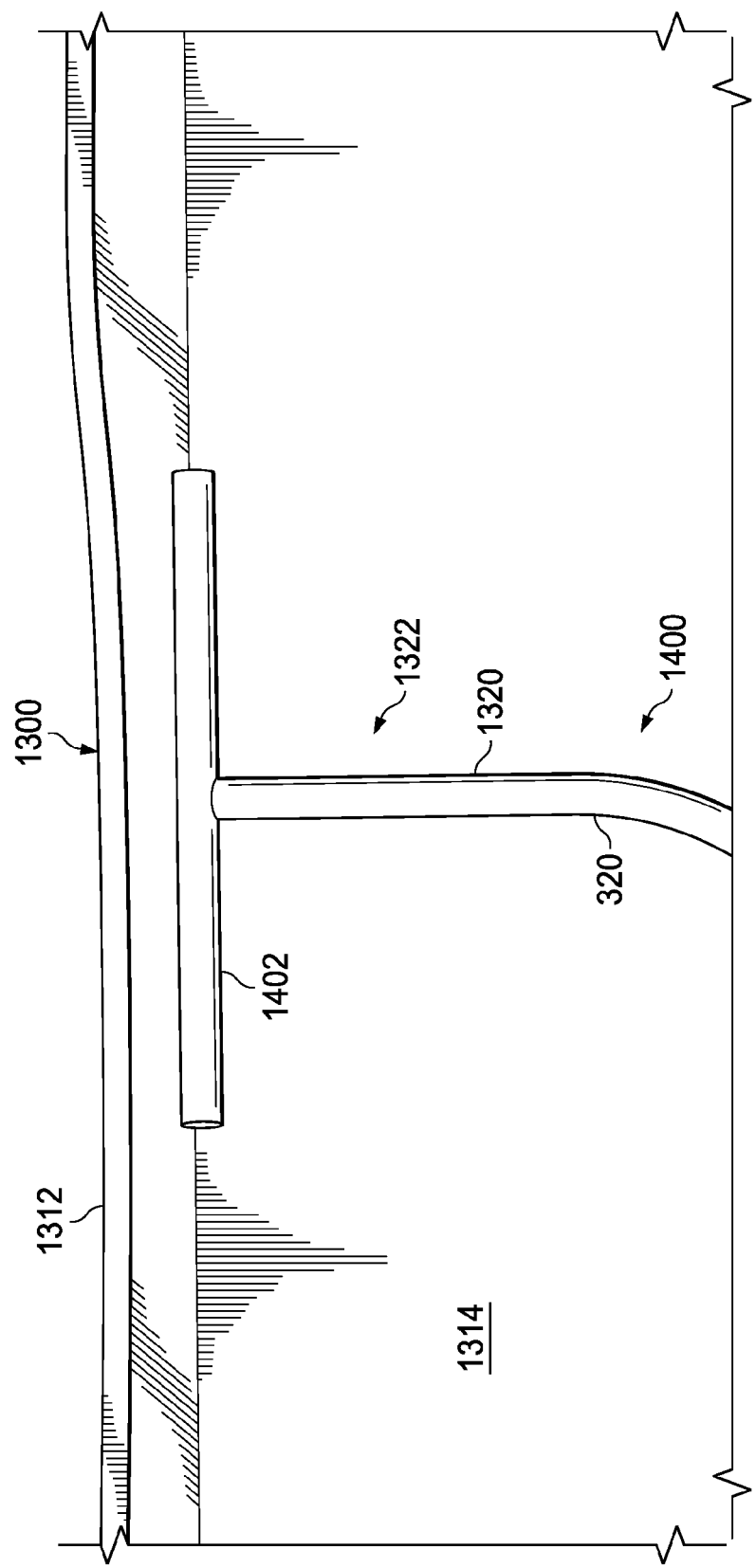
FIG. 14 is an illustration of a first end of a retaining device positioned with respect to a first frame in accordance with an illustrative embodiment.

Referring next to FIG. 14, an illustration of a first end of a retaining device positioned with respect to a first frame is depicted in accordance with an illustrative embodiment. In this depicted example, a more detailed illustration of first end 1322 of retaining device 320 is shown positioned with respect to first frame 1300 from FIG. 13.

As depicted, first end 1322 of retaining device 320 has angled portion 1400. Bar 1402 extends from angled portion 1400. Bar 1402 is configured to hold an insulation blanket against chord 1312 and web 1314 of first frame 1300.

Figure 15:
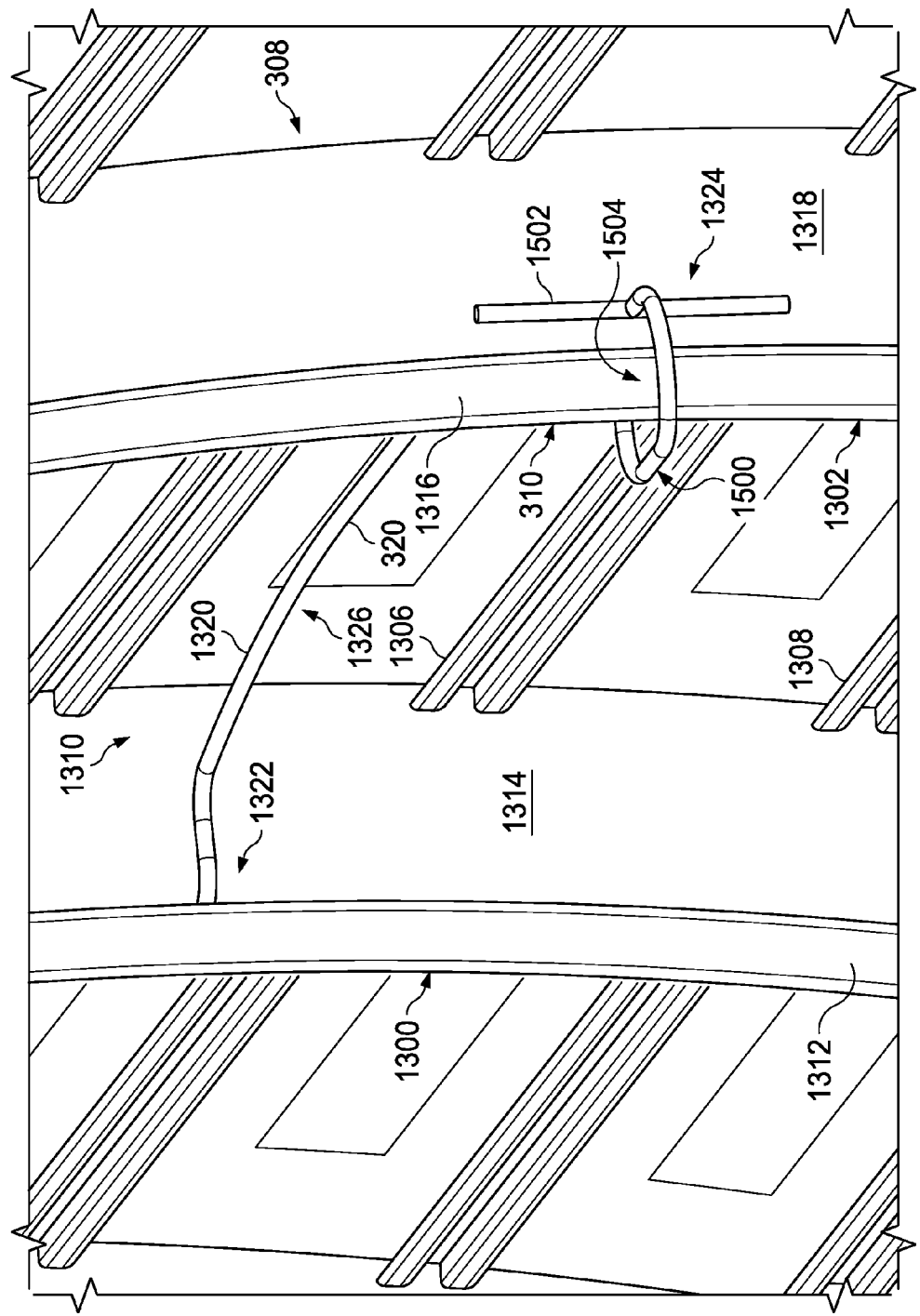
FIG. 15 is an illustration of a second end of a retaining device positioned with respect to a second frame in accordance with an illustrative embodiment.

In FIG. 15, an illustration of a second end of a retaining device positioned with respect to a second frame is depicted in accordance with an illustrative embodiment. In this depicted example, a more detailed illustration of second end 1324 of retaining device 320 is shown positioned with respect to second frame 1302 from FIG. 13.

As depicted, second end 1324 of retaining device 320 has curved portion 1500. Bar 1502 extends from curved portion 1500. Bar 1502 is configured to hold an insulation blanket against chord 1316 and web 1318 of second frame 1302.

Space 1504 is present between curved portion 1500 of second end 1324 of retaining device 320 such that the insulation blanket may separate from second frame 1302 to form a channel between the insulation blanket and second frame 1302 to allow gravity drainage of fluid from the area.

Curved portion 1500 of second end 1324 and bar 1502 support the weight of the insulation blanket as fluid is drained from the area. Bar 1502 holds the insulation blanket against chord 1316 of second frame 1302 as condensation is drained. In this manner, curved portion 1500 with bar 1502 allows fluid to drain without the insulation blanket sagging more than desired.

The illustrations of retaining device 316 and retaining device 320 in FIGS. 3-15 are not meant to imply physical or architectural limitations to the manner in which an illustrative embodiment may be implemented. Other components in addition to or in place of the ones illustrated may be used. Some components may be optional. For instance, in some illustrative examples, curved portion 902 of second end 410 of retaining device 316 may have a different shape than c-shape 1202.

In still other illustrative examples, a small space may be present between second frame 402 and insulation blanket 405. In this case, curved portion 902 may not touch insulation blanket 405 when installed in the aircraft.

In yet another illustrative example, insulation blanket 403, insulation blanket 404, and insulation blanket 405 may not overlap one another. Instead, a single insulation blanket may be used. In another illustrative example, bar 1000 on angled portion 900 of first end 408, bar 1002 on curved portion 902 of second end 410, or both may be absent from retaining device 316. Instead, at least one of angled portion 900 of first end 408 and curved portion 902 of second end 410 may be secured using an adhesive, a tape, or some other suitable type of fastening system.

The different components shown in FIGS. 3-15 may be illustrative examples of how components shown in block form in FIG. 1 and FIG. 2 can be implemented as physical structures. Additionally, some of the components in FIGS. 3-15 may be combined with components in FIG. 1 and FIG. 2, used with components in FIG. 1 and FIG. 2, or a combination of the two.

Figure 16:
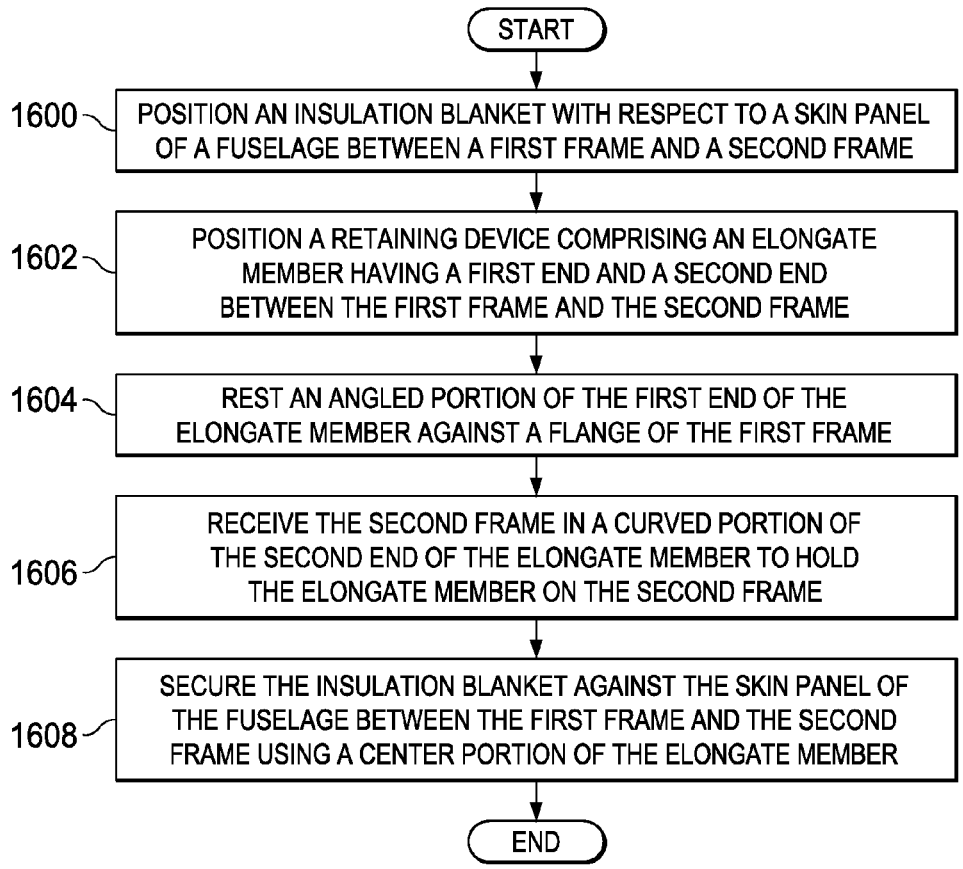
FIG. 16 is an illustration of a flowchart of a process for installing insulation in accordance with an illustrative embodiment.

With reference now to FIG. 16, an illustration of a flowchart of a process for installing insulation is depicted in accordance with an illustrative embodiment. The process described in FIG. 16 may be implemented to install insulation blankets 126 in fuselage 104 of aircraft 102 using retaining device 134 in manufacturing environment 100 shown in block form in FIG. 1.

The process begins by positioning an insulation blanket with respect to a skin panel of a fuselage between a first frame and a second frame (operation 1600). The first frame and the second frame are adjacent frames in the fuselage in this illustrative example. The insulation blanket may overlap other insulation blankets installed in the fuselage in this illustrative example.

Next, a retaining device comprising an elongate member having a first end and a second end is positioned between the first frame and the second frame (operation 1602). An angled portion of the first end of the elongate member is rested against a flange of the first frame (operation 1604).

Thereafter, the second frame is received in a curved portion of the second end of the elongate member to hold the elongate member on the second frame (operation 1606). The insulation blanket is then secured against the skin panel of the fuselage between the first frame and the second frame using a center portion of the elongate member (operation 1608) with the process terminating thereafter. The process described in FIG. 16 may be repeated for a number of retaining devices used to hold insulation blankets in place.

Figure 17:
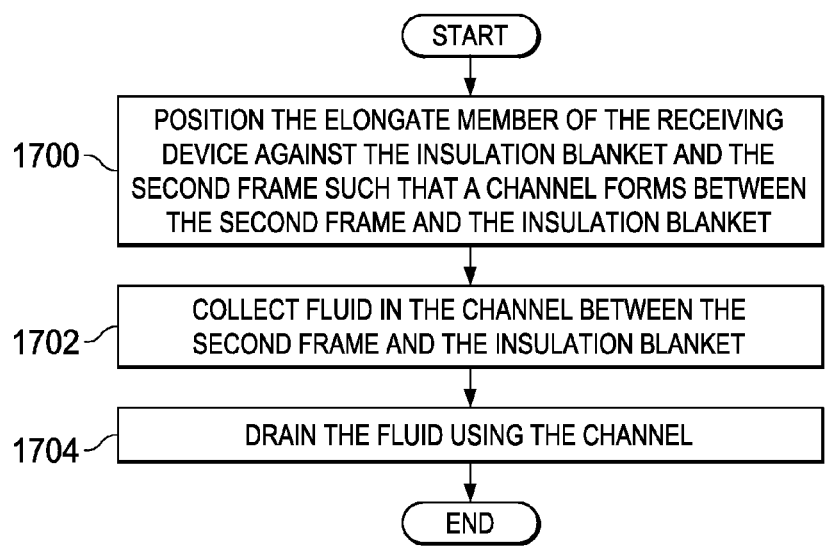
FIG. 17 is an illustration of a flowchart of a process for draining a fluid from a fuselage in accordance with an illustrative embodiment.

With reference now to FIG. 17, an illustration of a flowchart of a process for draining a fluid from a fuselage is depicted in accordance with an illustrative embodiment. The process begins by positioning the elongate member of the receiving device against the insulation blanket and the second frame such that a channel forms between the second frame and the insulation blanket operation 1700). Fluid then collects in the channel between the second frame and the insulation blanket (operation 1702).

Next, the fluid is drained using the channel (operation 1704) with the process terminating thereafter. The curved portion of the second end of the elongate member supports the weight of the fluid and the insulation blanket as the fluid is drained using the channel. Once the fluid is drained, the curved portion may return to its original position. In this manner, the retaining device provides a guttering mechanism to drain undesired fluid from the fuselage.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of module, a segment, a function, or a portion a combination thereof of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 18:
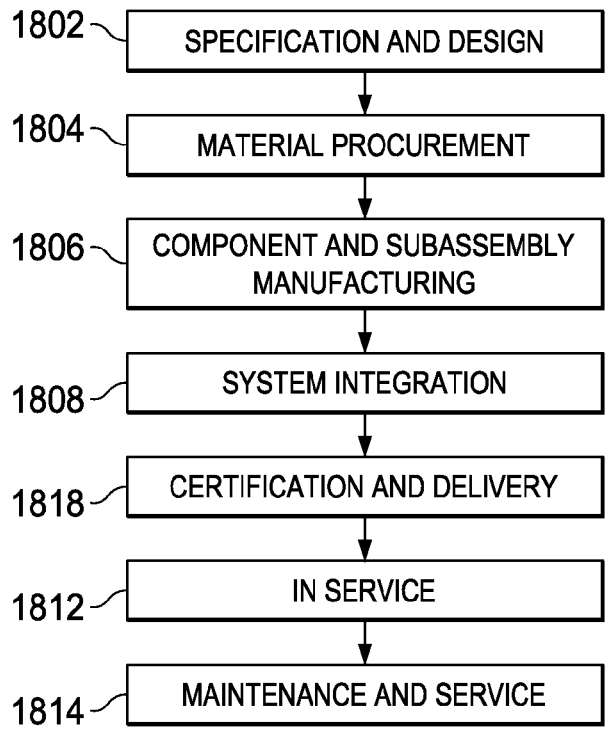
FIG. 18 is an illustration of an aircraft manufacturing and service method in the form of a block diagram in accordance with an illustrative embodiment.
Figure 19:
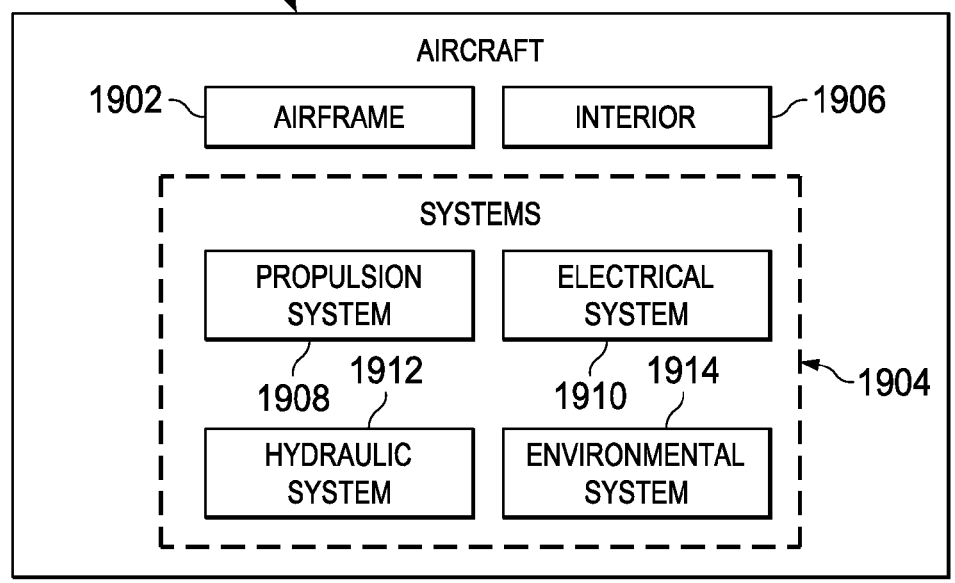
FIG. 19 is an illustration of an aircraft in the form of a block diagram in which an illustrative embodiment may be implemented.

Illustrative embodiments of the disclosure may be described in the context of aircraft manufacturing and service method 1800 as shown in FIG. 18 and aircraft 1900 as shown in FIG. 19. Turning first to FIG. 18, an illustration of an aircraft manufacturing and service method is depicted in the form of a block diagram in accordance with an illustrative embodiment. During pre-production, aircraft manufacturing and service method 1800 may include specification and design 1802 of aircraft 1900 in FIG. 19 and material procurement 1804.

During production, component and subassembly manufacturing 1806 and system integration 1808 of aircraft 1900 in FIG. 19 takes place. Thereafter, aircraft 1900 in FIG. 19 may go through certification and delivery 1810 in order to be placed in service 1812. While in service 1812 by a customer, aircraft 1900 in FIG. 19 is scheduled for routine maintenance and service 1818, which may include modification, reconfiguration, refurbishment, and other maintenance or service.

Each of the processes of aircraft manufacturing and service method 1800 may be performed or carried out by a system integrator, a third party, an operator, or a combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 19, an illustration of an aircraft is depicted in the form of a block diagram in which an illustrative embodiment may be implemented. In this example, aircraft 1900 is produced by aircraft manufacturing and service method 1800 in FIG. 18 and may include airframe 1902 with plurality of systems 1904 and interior 1906. Examples of systems 1904 include one or more of propulsion system 1908, electrical system 1910, hydraulic system 1912, and environmental system 1918. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1800 in FIG. 18. In particular, retaining device 134 from FIG. 1 may be installed during any one of the stages of aircraft manufacturing and service method 1800. For example, without limitation, retaining device 134 may be positioned in the fuselage of aircraft 1900 to hold insulation blankets in the fuselage during at least one of component and subassembly manufacturing 1806, system integration 1808, routine maintenance and service 1818, or some other stage of aircraft manufacturing and service method 1800.

In one illustrative example, components or subassemblies produced in component and subassembly manufacturing 1806 in FIG. 18 may be fabricated or manufactured in a manner similar to components or subassemblies produced while aircraft 1900 is in service 1812 in FIG. 18. As yet another example, one or more apparatus embodiments, method embodiments, or a combination thereof may be utilized during production stages, such as component and subassembly manufacturing 1806 and system integration 1808 in FIG. 18. One or more apparatus embodiments, method embodiments, or a combination thereof may be utilized while aircraft 1900 is in service 1812, during maintenance and service 1818 in FIG. 18, or a combination thereof. The use of a number of the different illustrative embodiments may substantially expedite the assembly, reduce the cost of aircraft 1900, or both.

Thus, the illustrative embodiments provide a method and apparatus for installing insulation in aircraft 102 as shown and described with reference to FIG. 1 and FIG. 2. Retaining device 134 comprises elongate member 200 having first end 203 and second end 204. Elongate member 200 is configured to be positioned between first frame 118 and second frame 120 in fuselage 104 of aircraft 102 to hold insulation blanket 128 against skin panel 117 of fuselage 104. First end 203 comprises angled portion 206 configured to rest against first frame 118. Second end 204 comprises curved portion 208 configured to receive second frame 120 and hold elongate member 200 on second frame 120.

With the use of an illustrative embodiment, insulation blanket 128 may be held against skin panel 117 to insulate skin panel 117. Retaining device 134 with elongate member 200 reduces the amount of undesired separation between insulation blanket 128 and skin panel 117. Retaining device 134 holds insulation blanket 128 in place without installing holes in insulation blanket 128 or using clips that may cause undesired separation between insulation blanket 128 and first frame 118, second frame 120, or both. A portion of first end 203 of elongate member 200 rests against the web of first frame 118 and a portion of second end 204 of elongate member 200 rests against the web of second frame 120 such that insulation blanket 128 is held against each web. This configuration further secures insulation blanket 128 in fuselage 104 and reduces sagging of insulation blanket 128.

Additionally, with the use of retaining device 134, insulation blanket 128 may be held close to skin panel 117 of fuselage 104 such that the amount of fluid 136 flowing between skin panel 117 and insulation blanket 128 is reduced. When condensation 140 forms between insulation blanket 128 and skin panel 117, retaining device 134 with curved portion 208 of elongate member 200 allows condensation 140 to collect in channel 142 formed between second frame 120 and insulation blanket 128. Retaining device 134 continues to hold insulation blanket 128 in place to prevent sagging. Condensation 140 may drain using channel 142 in a desired manner.

Retaining device 134 is also designed such that elongate member 200 comprises a lightweight material that does not increase the overall weight of fuselage 104 more than desired. Retaining device 134 may be manufactured to have smooth surfaces such that the damage to insulation blanket 128 from installing retaining device 134 is reduced or eliminated. Further, because retaining device 134 is a mechanical device that is removable, retaining device 134 may be moved to different locations within fuselage 104 or reused in other aircraft.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
an elongate member comprising a center portion integrally connected to: an angled portion at a first end of the elongate member, and a curved portion at a second end of the elongate member, such that the angled portion terminates with a first bar centered upon, and substantially perpendicular to, a central axis of a core of the angled portion, and the curved portion comprises a shape that curves, away from a length of the center portion and then curves, substantially 270 degrees, back toward the center portion and terminates with second bar centered upon, and substantially perpendicular to, a central axis of a core of the curved portion.

2. The apparatus of claim 1, wherein the curved portion is configured to loop around a frame and rest on a flange of the frame.

3. The apparatus of claim 1, wherein the elongate member comprises a material selected from at least one of a plastic, a composite material, a metal, or a metal alloy.

4. The apparatus of claim 1, wherein the center portion comprises a thickness that is greater than a thickness at the first end and the second end.

5. The apparatus of claim 1, wherein a thickness of the elongate member tapers from the center portion to the first end and from the center portion to the second end.

6. The apparatus of claim 1, wherein the elongate member is a flexible beam having a desired level of stiffness.

7. The apparatus of claim 1, further comprising the shape comprising at least one of: a c-shape, a u-shape, and a circular shape.

8. The apparatus of claim 1, wherein the elongate member comprises one of a solid core or a hollow core.

9. The apparatus of claim 1, the second end of the elongate member being configured such that it facilitates formation of a channel between a frame and an insulation blanket.

10. The apparatus of claim 9, the second end being configured such that when positioned around the frame, the channel allows condensation to drain through the channel formed between the frame and insulation blanket.

11. A method for installing insulation, the method comprising:
positioning an elongate member between a first frame and a second frame, thus holding an insulation blanket against a skin panel via resting a first bar against the first frame and receiving and holding the second frame in a curved portion of the elongate member, the elongate member comprising a center portion integrally connected to: an angled portion at a first end of the elongate member, and the curved portion at a second end of the elongate member, such that the angled portion terminates with the first bar and the curved portion comprises a shape that curves, away from a length of the center portion and then curves, substantially 270 degrees, back toward the center portion and terminates with second bar centered upon, and substantially perpendicular to, a central axis of a core of the curved portion, the first bar being centered upon, and substantially perpendicular to, a central axis of a core of the angled portion.

12. The method of claim 11 further comprising:
positioning the insulation blanket with respect to the skin panel of an aircraft between the first frame and the second frame.

13. The method of claim 12 further comprising:
securing the insulation blanket against the skin panel between the first frame and the second frame using the center portion of the elongate member.

14. The method of claim 13 further comprising:
positioning the elongate member against the insulation blanket and the second frame such that a channel forms between the second frame and the insulation blanket, wherein condensation collects in the channel.

15. The method of claim 14, wherein the curved portion of the second end of the elongate member supports the insulation blanket as the condensation is drained.

\* \* \* \* \*